May 24, 1955
S. C. HETH
2,709,116
JOURNAL FOR A TRANSPORT WHEEL
Filed Oct. 4, 1950
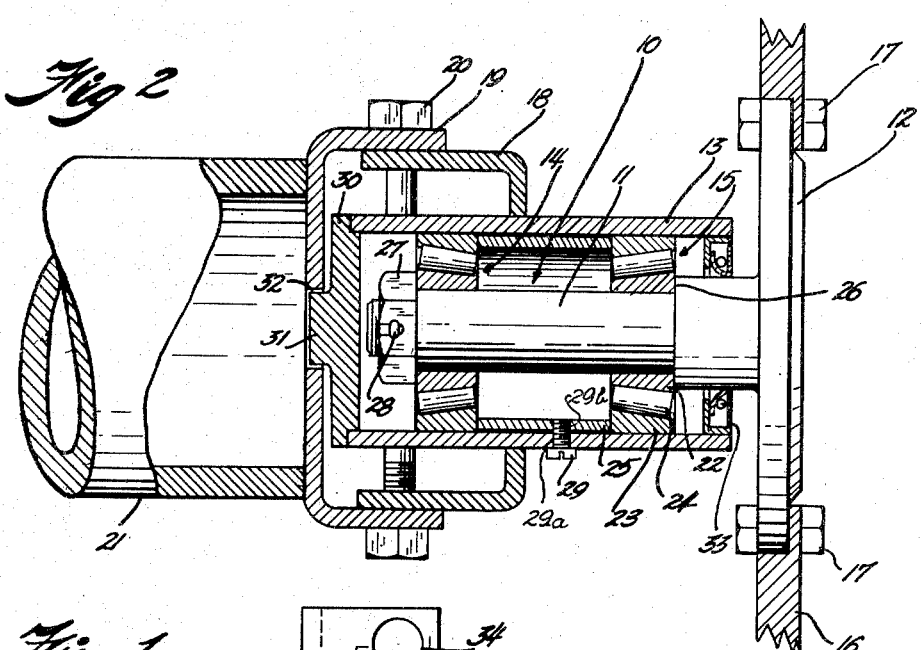
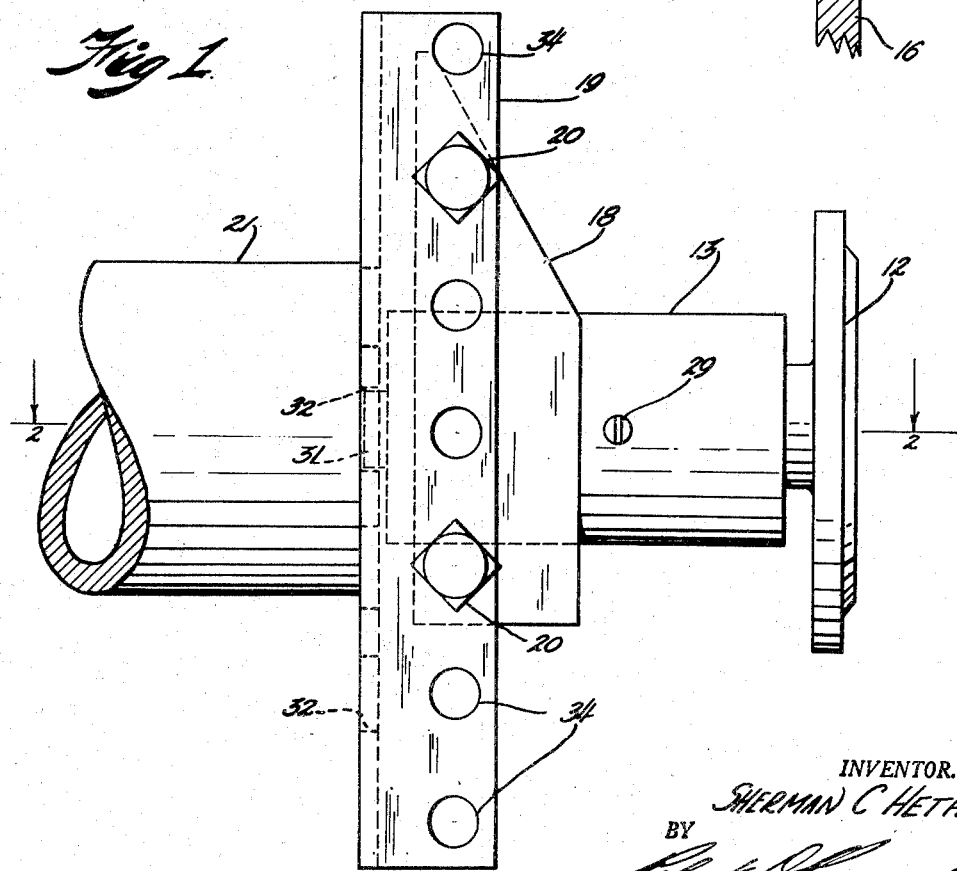
INVENTOR.
SHERMAN C HETH
BY
ATTY.

United States Patent Office 2,709,116
Patented May 24, 1955

2,709,116

JOURNAL FOR A TRANSPORT WHEEL

Sherman C. Heth, Racine, Wis., assignor to J. I. Case Company, Racine, Wis., a corporation of Wisconsin Application October 4, 1950, Serial No. 188,434

1 Claim. (Cl. 301—105)

The present invention relates to transport wheels adapted to be used on vehicles of various types including farming implements, and has more particularly to do with the hub and bearing assemblies thereof.

The transport wheel of conventional design in use in present machines comprising a cast iron hub in bearing relationship with a non-rotatable spindle. The hub is usually provided with a plurality of radially extending spokes for carrying a wheel rim or other suitable rolling means. Since the cast iron hub is rotated directly upon the spindle, which is preferably formed of steel or other suitably hardened material, the user must frequently stop the machine to lubricate this bearing, forgetfulness usually resulting in overheating and occasionally in damage thereto. A further disadvantage in a bearing of this type is the comparatively high co-efficient of friction which results in wasted energy and consequently in a higher operating cost to the user.

With the above in view it is a principal object of the present invention to provide a bearing assembly for use with a transport wheel which requires few parts and which can be easily assembled into a unit which requires little or no attention when in use.

A further object of the invention is to provide a transport wheel which can be vertically adjusted with respect to the implement for carrying the implement at various elevations with respect to the ground.

A still further object of the invention is to rotatably support the spindle of a transport wheel on anti-friction bearings.

Other objects and advantageous features of the present invention will appear from the following description of the preferred embodiment of our invention as illustrated in the accompanying drawings, in which:

Fig. 1 is a side elevation of a transport wheel bearing assembly embodying the present invention with parts removed.

Fig. 2 is a horizontal cross section view of the transport wheel bearing assembly taken on the line 2—2 of Fig. 1, with parts removed.

Referring to the drawings, the numeral 10 designates a transport wheel spindle comprising in the present instance a spindle shaft 11 and a hub portion 12 fixed or integral and co-axial with the shaft 11. The shaft 11 is rotatably mounted in a housing 13 preferably of tubular construction and is carried adjacent the ends of the housing 13 on anti-friction bearings 14 and 15. A wheel of any suitable or well known type 16, only partly shown in the drawings, is secured to the hub portion 12 as by conventional bolts or the like 17 in any well known manner. The housing 13 in the present instance is welded, or secured in any suitable manner, to a bracket 18 which in turn is adjustably secured in a channel-shaped bracket 19 as by bolts 20—20. Bracket 19 is welded or secured in any suitable manner to an axle tubing or other frame member 21 of any implement such as a corn picker but not necessarily limited in application thereto.

As seen in Fig. 2 the bearings 14 and 15 in the present instance, are anti-friction bearings of a generally well known form, each comprising an inner race 22, an outer race 23, and anti-friction elements 24 preferably of a character which provide for adjustment of the clearance between the anti-friction elements and the races by relative axial movement between the races, for example tapered rollers, the outer race 23 of each bearing, in the present instance, having a sliding fit within housing 13, and the inner race 22 having a frictional fit on the spindle shaft 11. A cylindrical spacer sleeve 25 is interposed between the outer races 23 of the bearings 14 and 15. Spacer sleeve 25 is slightly smaller in diameter than the bore of the housing 13 so as to fit freely therein. Wheel spindle 10 is provided with a shoulder 26 to form an abutment for the inner race 22 of the bearing 15. The bearing 14 abuts the inner end surface of the spacer 25 so that the latter is held in close contact with the sides of the outer races 23 of the respective bearings 14 and 15. A nut 27 is threaded on the inner end of the spindle shaft 11, and provides means whereby the bearing 15, the spacer 25, and the bearing 14 are held against axial displacement on the spindle shaft 11, but whereby the spindle 10 is allowed to rotate freely in the bearings 14 and 15. A conventional locking means 28, such as a cotter pin, can be used to secure nut 27 against becoming loosened. The assembly above described is inserted in the housing 13 and secured therein by a screw or any other suitable means 29 engaged in openings 29a and 29b formed respectively in the housing 13 and the sleeve 25, one or both of which openings may be tapped for retention of the screw. When the spacer sleeve 25 is aligned properly with the housing 13, screw 29 is inserted, thereby fixing the axial position of the spindle assembly. It will be apparent that any slack or lost motion between the races and the anti-friction elements of the bearings 14 and 15 is eliminated by means of nut 27 before the above assembly is secured in the housing by screw 29, nut 27 being tightened against the inner race 22 of bearing 14 to the extent desired, and forcing it to the right as seen in Fig. 2. Such movement carries with it rollers 24 and outer race 23, which moves until it abuts spacer 25. Further tightening of nut 27 moves shaft 11 to the left, urging inner race 22 of bearing 15 to the left. Such movement urges rollers 24 to the left and which rollers force outer race 23 also to the left into contact with spacer 25. All looseness in bearings 14 and 15 can thus be eliminated, and in practice nut 27 is usually adjusted until a desired moderate amount of pressure is set up between the races and rollers and the adjustment is prevented from changing by locking means 28.

A cap 30 is welded or suitably secured to the inner end of the housing 13 and is provided with a guide and support extension 31 which protrudes through an opening 32 formed in the holding bracket 19 as will be further explained hereinafter. The housing 13 is sealed from dust or other grit material by an inner seal 33 between the housing 13 and spindle 10, such seal 33 seating in the open end of the housing 13. Upon assembly of this bearing the bearings 14 and 15 and the spacer sleeve 25 are adjusted upon the spindle 10 by nut 27 and then this assembly is inserted into the housing 13, the annular seal 33 having been previously placed in position on spindle 11. Upon insertion into the housing 13 the sleeve 25 is aligned with the housing 13 and the screw 29 threaded into the sleeve thereby locking the spindle in its proper position in the housing 13. The bearing assembly is packed in heavy grease before assembly and upon assembly sealed within the housing 13 by the inner seal 33. It should be appreciated that this bearing assembly besides substantially eliminating friction, does not demand the time and labor of the user in order to ensure that the bearing is well lubricated at all times, the heavy grease packing lasting substantially the lifetime of the implement or of the transport wheel. The transport wheel spindle 10 and the bearing assembly can be pulled laterally out of the housing 13 and disassembled by removing the screw 29 and pulling on the end of the spindle 10, thereby providing an easy method of disassembly in the event the need should ever arise.

For adjusting the transport wheel to varying positions with respect to the implement, the bracket 18 as already suggested is slidable substantially vertically in the holding bracket 19 and is secured in said holding bracket by transversely extending bolts 20, vertically spaced bolt holes 34 being formed in the holding bracket 19 for providing a range of adjustment for the bracket 18 with respect to the holding bracket 19. This is accomplished by supporting axle or frame member 21 in some well known manner and removing bolts 20—20. Bracket 18 is then shifted relatively to holding bracket 19 and bolts 20—20 are re-inserted in different holes 34—34 whereupon housing 13 is again rigid with member 21 but in a new position. The extension 31 of the bracket 18 as already suggested protrudes through the opening 32 formed in the inner face of the holding bracket 19 thereby supporting the inner end of the housing 13 in the bracket 19 and relieving the bracket 18 of excessive stresses and strains at the point of juncture of the housing 13 to the bracket 18. The extension 31 further aids in aligning the adjustment holes 34 with the bolt holes formed in the bracket 18 for insertion of the bolts 20 by supporting the housing 13 while the wheel can be pivoted upwardly or downwardly. To take the fullest possible advantage of this feature, a plurality of openings 32 is provided, one for each possible position of bracket 18.

Various improvements and modifications within the spirit of my invention will doubtless occur to those skilled in the art from the disclosure herein given, and hence I do not wish to be limited to the uses mentioned except to the extent that my invention is defined in the appended claim, which is to be interpreted as broadly as is consistent with the state-of-the-art.

I claim:

In a device for supporting an agricultural implement an outwardly open vertically disposed channel element fixed on the implement and providing outwardly extending opposed sides and a vertically disposed connecting web, said sides being provided with spaced aligned apertures, correspondingly spaced apertures being provided in said web, a shoe-like inwardly open vertically disposed channel member having inwardly extending opposed sides and a vertically disposed connecting web, the last mentioned web providing an opening, a bearing sleeve fixed in said opening and projecting inwardly from said last mentioned web, said shoe-like channel member having apertures formed in the sides thereof spaced to correspond with the plurality of apertures in the sides of the first mentioned channel member, bolts extending through aligned apertures in said channel members on opposite sides of said bearing sleeve, and rigid means on said bearing sleeve engaging one of said apertures in the first mentioned web, said bolts and said rigid means serving to mount said bearing sleeve rigidly on said implement in any of a plurality of vertically adjusted positions.

References Cited in the file of this patent

UNITED STATES PATENTS

| | | |
|---|---|---|
| 319,257 | Hunt | June 2, 1885 |
| 882,846 | Sachs | Mar. 24, 1908 |
| 944,936 | Barnett | Dec. 28, 1909 |
| 1,293,605 | Yeakley | Feb. 4, 1919 |
| 1,355,652 | Coppus et al. | Oct. 12, 1920 |
| 1,491,014 | Ludwick | Apr. 22, 1924 |
| 2,005,547 | Johnson | June 18, 1935 |
| 2,103,912 | Montgomery | Dec. 28, 1937 |
| 2,275,302 | Magnuson | Mar. 3, 1942 |
| 2,532,076 | Raney et al. | Nov. 28, 1950 |